(12) United States Patent
Hawkes et al.

(10) Patent No.: US 10,316,220 B2
(45) Date of Patent: Jun. 11, 2019

(54) CONTROLLABLE ADHESIVE ON CONFORMABLE FILM FOR NON-FLAT SURFACES

(71) Applicant: The Board of Trustees of the Leland Stanford Junior University, Palo Alto, CA (US)

(72) Inventors: Elliot W. Hawkes, San Francisco, CA (US); David L. Christensen, Los Altos, CA (US); Srinivasan Arul Suresh, Stanford, CA (US); Mark R Cutkosky, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 131 days.

(21) Appl. No.: 14/993,332

(22) Filed: Jan. 12, 2016

(65) Prior Publication Data

US 2016/0200946 A1 Jul. 14, 2016

Related U.S. Application Data

(60) Provisional application No. 62/103,165, filed on Jan. 14, 2015.

(51) Int. Cl.
*C09J 7/00* (2018.01)
*C09J 183/04* (2006.01)
(Continued)

(52) U.S. Cl.
CPC . *C09J 7/00* (2013.01); *C09J 7/22* (2018.01); *C09J 7/28* (2018.01); *C09J 183/04* (2013.01); *C09J 2201/122* (2013.01); *C09J 2201/162* (2013.01); *C09J 2201/28* (2013.01); *C09J 2201/626* (2013.01); *C09J 2400/226* (2013.01); *C09J 2483/00* (2013.01)

(58) Field of Classification Search
CPC .................................................. C09J 2201/626
See application file for complete search history.

(56) References Cited

U.S. PATENT DOCUMENTS

| 6,838,150 B2 * | 1/2005 | Mazurek | B29C 43/222 428/103 |
| 2012/0295068 A1 * | 11/2012 | Cutkosky | B29C 33/3857 428/167 |

(Continued)

FOREIGN PATENT DOCUMENTS

| DE | 202009016463 U1 | 3/2010 |
| WO | WO2015110350 A1 | 7/2015 |

*Primary Examiner* — Frank D Ducheneaux
(74) *Attorney, Agent, or Firm* — Lumen Patent Firm

(57) ABSTRACT

A controllable adhesive for non-flat surfaces is provided. The device has a conformable (i.e. flexible) film and directly cast thereto a synthetic dry adhesive film. The synthetic dry adhesive film has elastomeric wedges. The conformable film is capable to deform to a non-flat surface. In one embodiment, the controllable adhesive has a first loading mechanism at one end of the controllable adhesive to apply load to the controllable adhesive. In another embodiment, forming a gripper, the controllable adhesive has a second controllable adhesive with a second loading mechanism, such that the first and second loading mechanism face each other and join a common point of loading.

5 Claims, 12 Drawing Sheets

(51) Int. Cl.
*C09J 7/22* (2018.01)
*C09J 7/28* (2018.01)

(56) References Cited

U.S. PATENT DOCUMENTS

| | | |
|---|---|---|
| 2014/0225391 A1 | 8/2014 | Kuolt |
| 2014/0227473 A1 | 8/2014 | Parness |
| 2014/0272272 A1* | 9/2014 | Spenko .................. C09J 9/00 428/113 |
| 2016/0052144 A1 | 2/2016 | Spicer |

* cited by examiner

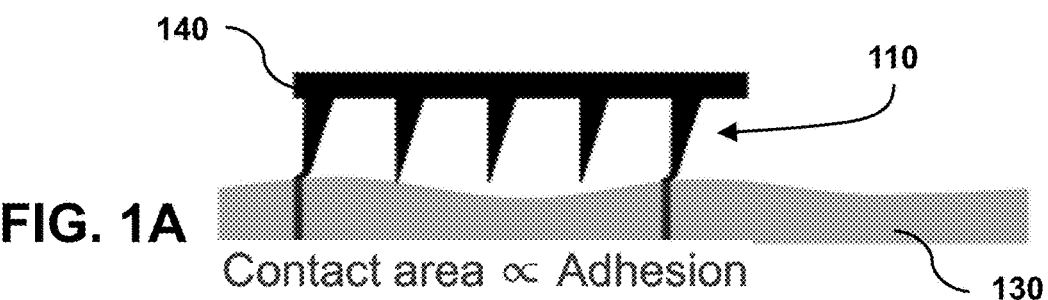
FIG. 1A  Contact area ∝ Adhesion
FIG. 1B
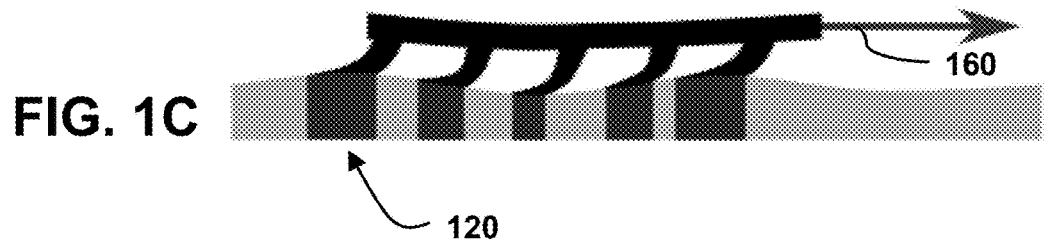
FIG. 1C

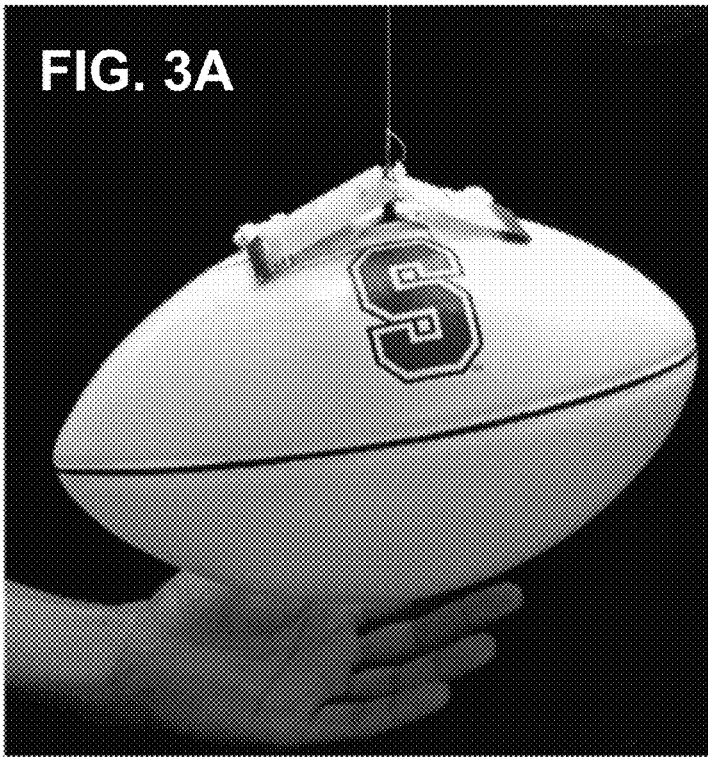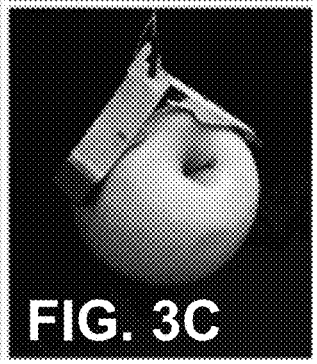

CONTROLLABLE ADHESIVE ON CONFORMABLE FILM FOR NON-FLAT SURFACES

CROSS-REFERENCE TO RELATED APPLICATIONS

This application claims priority from U.S. Provisional Patent Application 62/103,165 filed Jan. 14, 2015, which is incorporated herein by reference.

STATEMENT OF GOVERNMENT SPONSORED SUPPORT

This invention was made with Government support under contract HR0011-12-C-0040 awarded by the Defense Advanced Research Projects Agency. The Government has certain rights in the invention.

FIELD OF THE INVENTION

The invention relates to bio-inspired mechanisms and robotic systems. In particular, the invention relates to gecko-inspired adhesives capable of interacting with non-flat surfaces.

BACKGROUND OF THE INVENTION

Biological systems are remarkably complex. They are composed of spatially varying materials and they exhibit geometric features over a wide range of length scales, from hundreds of nanometers to centimeters and above. Biological tissues and organisms can grow and differentiate cell-by-cell incorporating new materials and combinations of materials and taking on new forms with each step. A poster child for biological complexity is the gecko, which has inspired numerous efforts to create gecko-inspired adhesive materials. However, the gecko not only has an adhesive system terminating in spatulae with dimensions on the order of 100 nm but also has setal stalks, lamellae, branched digital tendons, blood-filled sinus cavities, and toes at varying length scales from micrometers to centimeters and with a wide range of material properties. No synthetic adhesive system combines more than a few comparable features, and none approaches the versatility of the gecko's adhesive system. The present invention advances the art of bio-inspired mechanisms and robotic systems using synthetic gecko-inspired adhesives capable of interacting with non-flat surfaces.

SUMMARY OF THE INVENTION

A controllable adhesive for non-flat surfaces is provided. The device has a conformable (i.e. flexible) film and directly cast thereto a synthetic dry adhesive film. The synthetic dry adhesive film has elastomeric wedges. The conformable film is capable to deform to a non-flat surface and has a conformability, c, with a minimum conformability, $c_{min}$, to allow the conformable film to conform to the non-flat surface. The conformability, c, ranges from 0.001 to 1000. In one embodiment, the controllable adhesive has a first loading mechanism at one end of the controllable adhesive to apply load to the controllable adhesive. In another embodiment, forming a gripper, the controllable adhesive has a second controllable adhesive with a second loading mechanism, such that the first and second loading mechanism face each other and join a common point of loading.

BRIEF DESCRIPTION OF THE DRAWINGS

FIGS. 1A-C show according to an exemplary embodiment of the invention a flexible film/backing with an adhesive conforming to a non-flat surface. FIG. 1A shows on a textured/non-flat surface, only a small percentage of the adhesive will be in contact initially with the surface. FIG. 1B shows that when the adhesives are loaded (loading and direction of loading indicated by arrow 150), however, the in-contact wedges will pull the backing (140) closer to the surface 130, allowing other wedges to engage as indicated by areas 120. FIG. 1C shows continued loading 160 further increases contact areas 120.

FIGS. 3A-C show according to an exemplary embodiment of the invention a gripper picking up common objects: in FIG. 3A a football is gripped along the long curvature (r is about 23 cm); in FIG. 3B a coffee mug is grasped obliquely (r is about 8 cm); and in FIG. 3C an apple presents strong curvature in two directions (r is about 7 cm).

FIG. 4D is a summary of FIGS. 4A-C including the gripper assembly.

Figure 2:
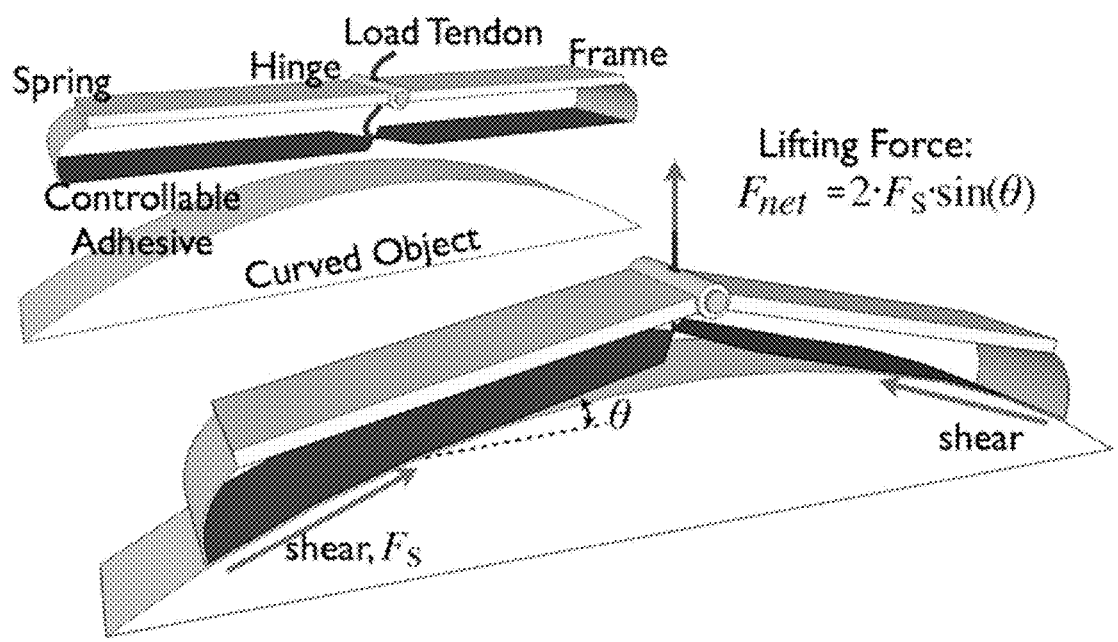
FIG. 2 shows according to an exemplary embodiment of the invention a schematic of a curved surface gripper showing components and forces. Load is supported by shear forces in the adhesive membrane; normal forces at the adhesive pads are negligible.
Figure 4A:
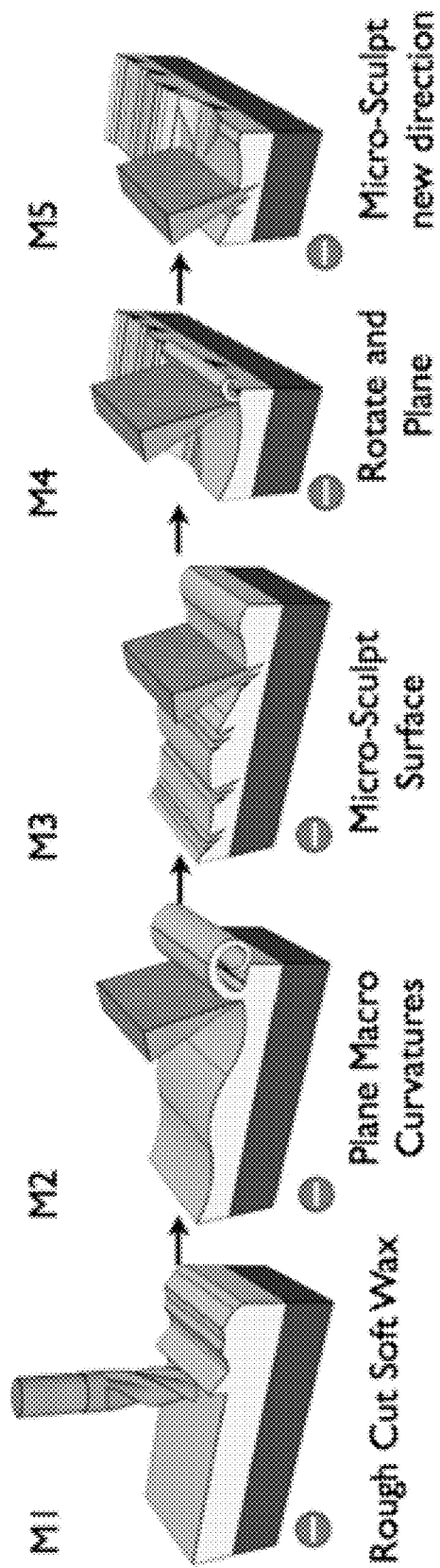
FIGS. 4A-D show according to an exemplary embodiment of the invention a process flow for manufacture of a curved surface gripper by $S^2DM$. In this case, the process involves three parallel flows—SμS (M1-M5, FIG. 4A), in which the surface texture mold is manufactured; laser patterning/cutting (F1-F4, FIG. 4B), where the electrically active film is cut to shape and then patterned for desired properties; and traditional SDM (S1-S6, FIG. 4C), involving machining, casting, and addition of prefabricated components. Nominally additive and subtractive steps are labeled with plus/minus signs.
Figure 4B:
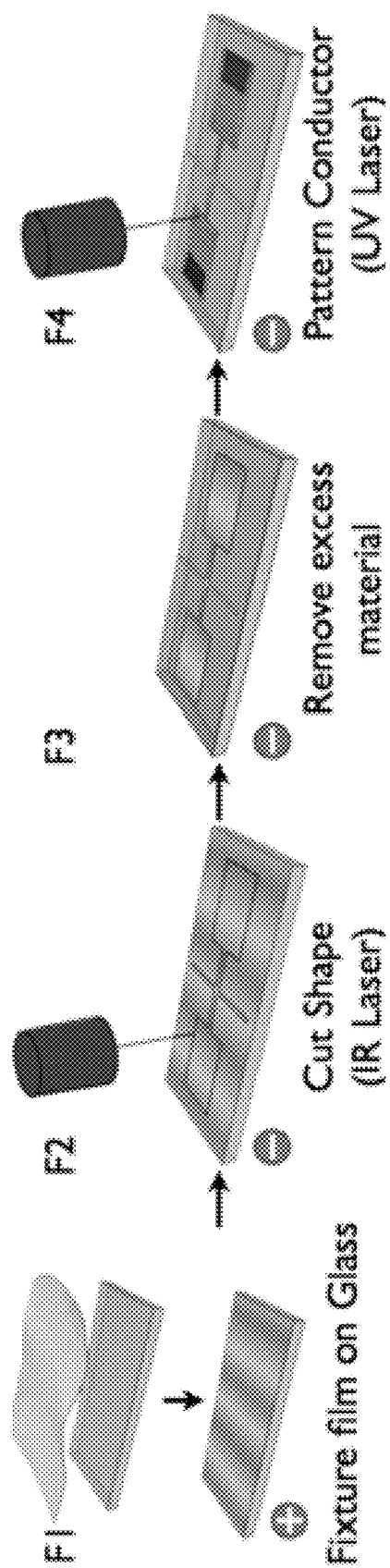
Figure 4C:
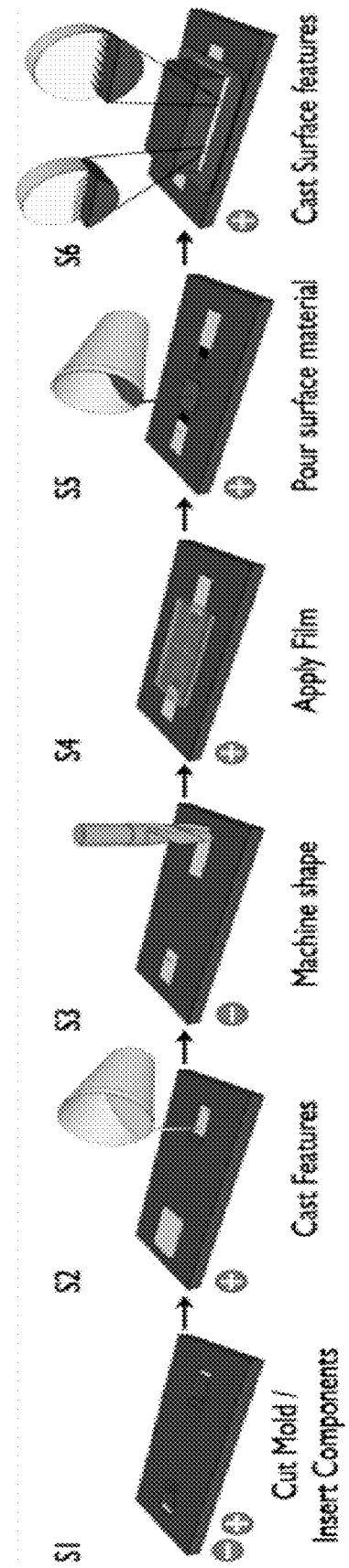
Figure 4D:
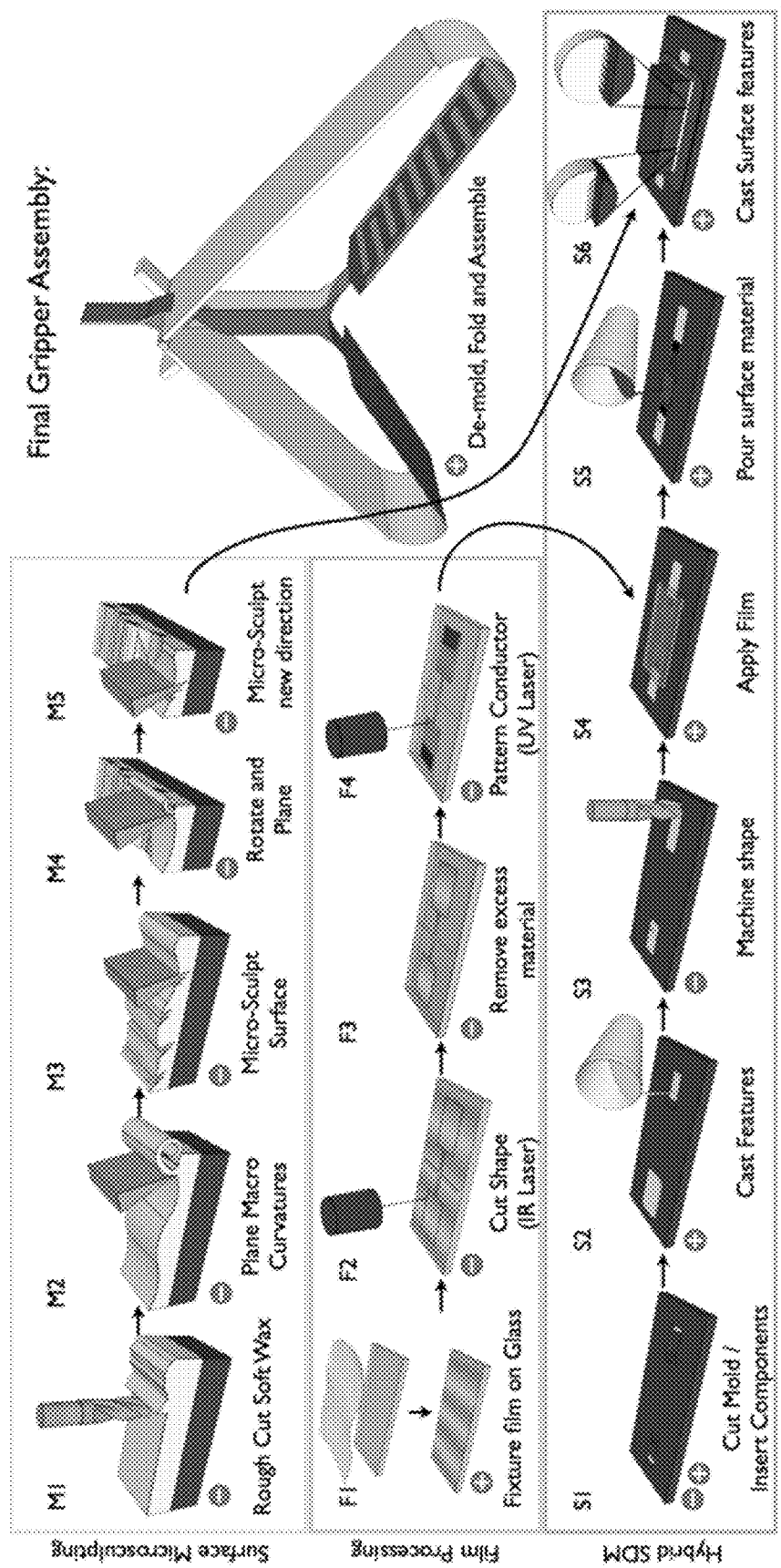

Film is etched copper clad Kapton, total area 12 cm². Sensor was tested by covering with a glass slide and varying the area of contact.

DETAILED DESCRIPTION

Controllable Adhesive on Conformable Film for Non-Flat Surfaces

As illustrated in FIGS. 1A-C, the shear adhesion that a microwedge adhesive 110 can create is proportional to the area of the adhesive in contact (illustrated by areas 120) with the surface 130. Therefore, it is important to create as much contact (i.e. areas 120 be as large as possible along the surface) between the adhesive and the surface to maximize adhesion. Most surfaces are not flat and not smooth as illustrated in FIGS. 1A-C by surface 130. Therefore, it maximize adhesion, embodiments of this invention introduce a controllable adhesive cast 110 directly to a thin, conformable film 140.

Rigid Adhesive Tile on Curved Surface

If a surface has a small local curvature, some of the adhesive will not contact the surface if the adhesive has a rigid backing. An example of this situation is an adhesive tile that is postage stamp-sized and is contacting a billiards ball—only a small patch of the adhesive will touch the ball. With only a small patch of adhesive in contact, only a small amount of adhesion is created.

To determine the relationship between the size of the adhesive tile and the allowable radius of curvature without a degradation of performance due to the loss of contact between the rigid tile and the surface, we note that:

$$r = \frac{L^2}{8h} + \frac{h}{2}$$

where r is the radius of curvature of the surface, L is the length of a side of the tile, and h is the height of the microwedges. As an example, with values h=100 microns, L=2.5 cm, then $r_{min}$=80 cm.

Conformable Film for Non-Flat Surfaces

To increase performance on objects that are not flat and not smooth, with this invention we introduce a controllable adhesive cast (110) directly to a conformable film (140). As shown in FIGS. 1A-C, film 140 deforms into the valleys between the peaks in a non-smooth surface 130. To determine the relationship between the minimum conformability of the film, that allows it to conform to a surface with features of a given geometry, we note that:

$$w = \frac{3}{16} \frac{\left(\frac{r}{2}\right)^4 P}{h^3 E}(1-v)(7+3v)$$

allowing us to define $c_{min}$ as:

$$c_{min} = \frac{P}{h^3 E} \propto \frac{w}{\left(\frac{r}{2}\right)^4}$$

where w is the depth of valley into which the film can conform, r is the spacing between peaks on the surface, P is the adhesive capability in the normal direction, h is the film thickness, E is the film modulus of elasticity, and v is Poisson's ratio for the film.

To grasp common (non-flat) surfaces, the film would have a conformity that varies from 0.001 cm⁻³ on the low end to necessary to grasp a large, smooth bowling ball, to 0.1 cm⁻³ to grasp a smooth billiards ball, up to 1000 cm⁻³ on the high end to conform to a pebbled leather like would be on the skin of a basketball.

To fully conform to dimples on a surface with r=1.5 mm and w=1.5 mm, a film with E=2 GPa and v=0.34 would need to be less than or equal to 25 micrometers thick, given an adhesive ability in the normal direction of 10 kPa. If the film is made thicker, for instance 50 microns thick, then the smallest features to which the film can completely conform are r=2.9 mm and w=2.9 mm.

Curved Surface or Non-Flat Surface Gripper Design

The insight of a controllable adhesive on a conformable film for non-flat surfaces opens up varies applications and designs. As an example design and utility, a gripper is described which integrates the concepts of the embodiment shown in FIGS. 1A-C.

Years of robotic research have created grippers of all shapes, sizes, materials, and actuation schemes; nearly all of these use normal forces to grasp an object—either directly or indirectly through friction. For large objects without small features, grasping with normal forces becomes difficult. With adhesion, it is possible to grasp using only shear forces, providing the ability to grasp very large radii of curvature and to grasp with less total force, since no normal forces are employed.

To create a shear gripper, certain design criteria must be met. First, the gripper must allow the adhesive to come into contact with the surface for curvatures in the desired range. Second, a load path for the shear forces used to support the object must be created. One design that meets the above criteria is shown in FIG. 2. The gripper has two main functional components: a thin film patterned with two opposed directional adhesive regions and a hinged frame.

Thin films and tapes are used for adhesives because bending stiffness, which must be overcome to conform to a surface, is proportional to thickness cubed while tensile stiffness, which helps to prevent localized stretching and peeling, is proportional to thickness. This means that tapes can conform well to surfaces, while still being stiff in the loading direction. For the grippers shown in FIGS. 2 and 3A-C, the film is a sheet of 25 micrometers thick metalized polyester film. The underside of the film has two patches of adhesive features, oriented in opposing directions on either side of the gripper. The adhesive engages when loaded in shear and disengages when unloaded. When a tensile load is applied at the center of the gripper, shear is applied in opposite directions to either side of the gripper; the adhesive engages the surface, and the object is supported, up to the shear limit of the adhesive material. When the shear is removed, the adhesive disengages, releasing the object.

For this gripper, in one embodiment, the metalized film was also patterned with pads for electrostatic adhesion and capacitive sensing. Electrostatic adhesion can help the film initially to conform to an object, but does not significantly increase the maximum lifting force. Capacitive sensing can be used to confirm that an adhesive pad has conformed to a surface.

The second component of the gripper in FIGS. 2 and 3A-C is the frame, which supports the film. The frame holds the film taut using flexible cantilevers when not in contact with the surface so that it can be laid down on a curve without wrinkles. When the gripper comes into contact with a surface, the frame collapses, folding at the center hinge. This allows the film to follow the curve of the surface and the adhesive to come into full contact with the curve. When the object must be released, the frame can be returned to its initial configuration, and the film will return to a taut state.

The gripper created using the process reported here has a mass of 6 grams and grasps a variety of curved objects weighing up to 11 N. FIGS. 3A-C shows the gripper picking up common objects with varying curvatures and surface textures. For the purposes of this invention, we focus on the manufacturing requirements imposed by such a design, which are not easily achieved by previously reported manufacturing or prototyping processes. The manufacturing process must be able to integrate thin patterned films, rigid links, flexible sections, and micrometer-scale gecko-inspired directional adhesives all with precise registration. Accordingly, we present S²DM as an integrated manufacturing process that includes microscopic surface texture with patterned films, links, and flexures.

S²DM Overview

S²DM is a combination of SDM, surface microsculpting, and laser cutting and patterning. SDM is a technique for iterated addition and removal of material to create complex 3D parts. Because of this process flow, SDM has many of the advantages of additive and subtractive manufacturing, including integrated multimaterial components and complex geometries afforded by additive processes as well as the smooth surface finish available from subtractive processes. Because of these advantages, SDM is used as the fundamental process for S²DM. Microsculpting and laser cutting/patterning are integrated to meet requirements for designs like the curved surface gripper.

FIGS. 4A-D shows the overall process flow for using S²DM to manufacture the curved surface gripper. In this case, the process separates into three largely parallel paths: microsculpting the texture (M1-M5), laser patterning the film (F1-F4), and conventional SDM (S1-S6). In the following sections, we describe each of the constituent processes, focusing on the roles of microsculpting, and laser patterning as new additions.

Surface Microsculpting

Surface microsculpting is a generalization of previously developed micromachining processes used to create directional adhesives and similar varying arrays of microscopic surface features.

Among the many processes used for creating synthetic dry adhesives, surface micromachining can create angled "microwedges" that produce adhesion in proportion to an applied shear stress. A similar process has been used to create magnetically actuated ridges with selective particle adhesion. The process involves patterning a wax mold by pushing a very sharp, smooth blade into the surface and creating wedge-shaped cavities. Silicone rubber or another elastomer is then cast into the mold to create a finely patterned sheet with controllable adhesive properties. Variations on these processes can produce features with differing size, profile or inclination without the cost of lithographic mold fabrication. As discussed below, surface microsculpting extends these concepts to allow machining of more complex textures.

Capabilities of Surface Microsculpting

Surface microsculpting (SµS) uses a combination of planning, indenting, and plastic deformation of rigid/plastic material, with or without removal, to create a wide range of shapes. A set of currently demonstrated feature parameters is presented in TABLE 1; most of these are functions of the tooling used and not a fundamental limit of the approach.

TABLE 1

Demonstrated capabilities of SµS

| | | |
|---|---|---|
| Minimum tip radius | | 2 µm |
| Feature radius of curvature | | 2-∞ µm |
| Minimum feature size | X | 15 µm |
| | Z | 20 µm |
| Maximum local feature size | X | 30 cm |
| | Z | 400 µm |
| Features per centimeter | | 0-650 |
| Maximum aspect ratio | Direct | 4.2 |
| | Indirect | 6 |
| Maximum backfill distance | | 60 µm |
| Maximum planning area | | 305 × 305 mm |

The blade used to cut or deform the wax is quite sharp (1 micrometer radius at tip), but has an associated included angle at the edge, limiting the minimum angle that can be directly machined into a shape. This angle is approximately 24 degrees on the blade used—larger than desirable for many textures.

Figure 5:
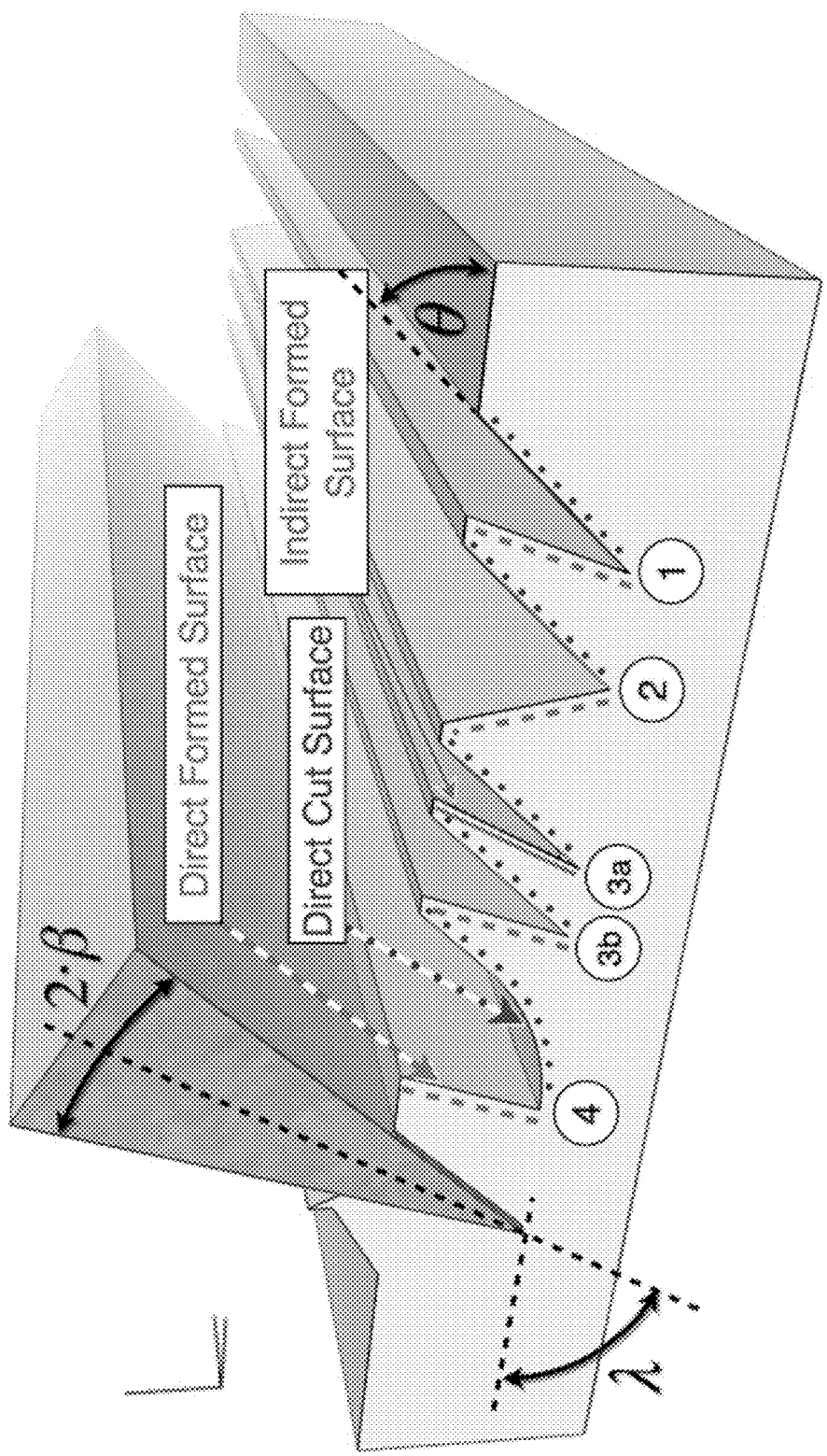
FIG. 5 shows according to an exemplary embodiment of the invention the coordinate system and illustration of sculpted surface. λ is the angle of the blade centerline with respect to the mold surface, β is the blade half angle, and θ is the local angle of the blade trajectory from the mold surface. Items 1, 2, and 4 are variations on direct cut and direct formed surfaces; item 3a has an indirect formed surface, modified by machining item 3b.
Figure 6:
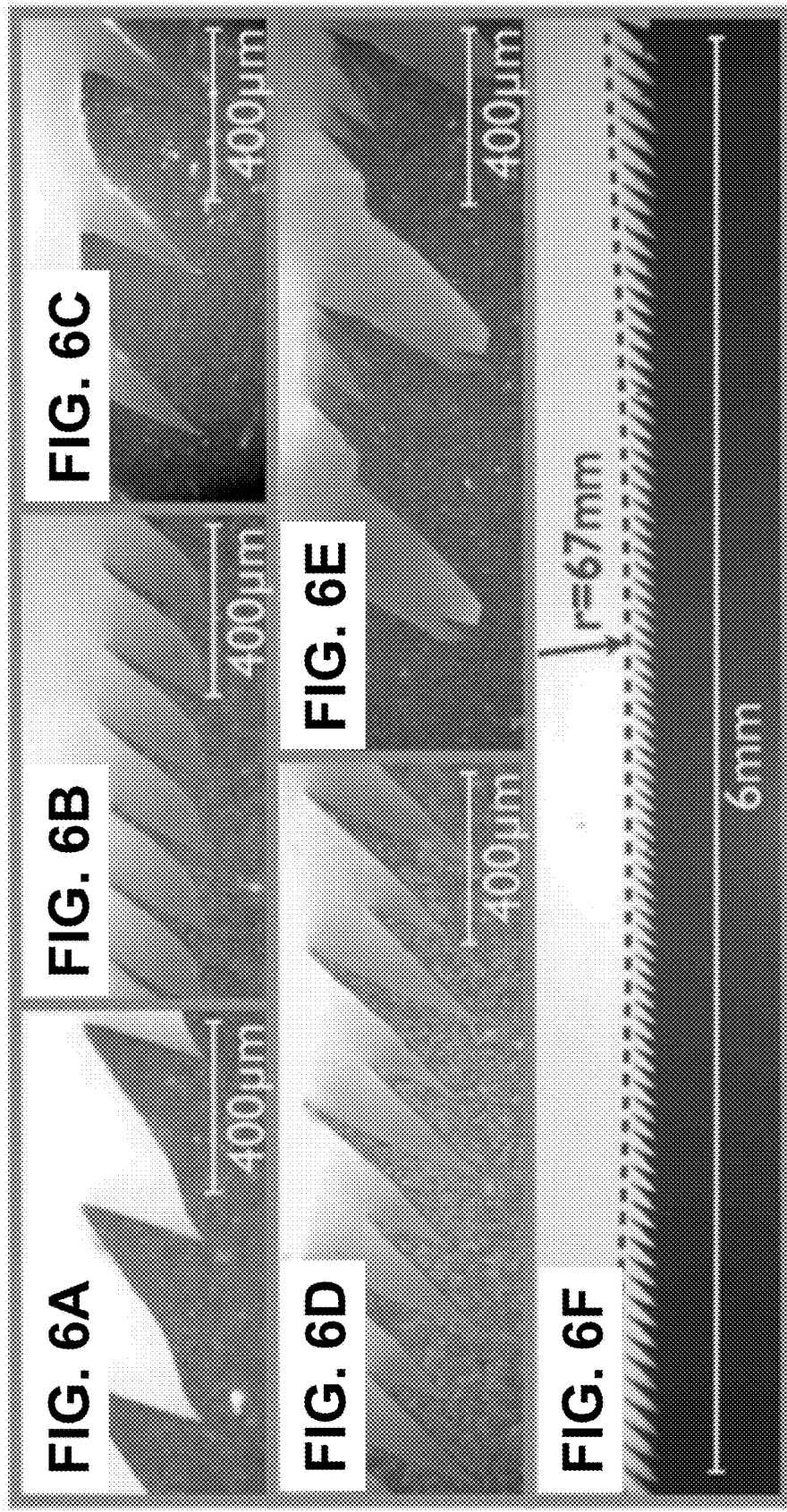
FIGS. 6A-F show according to an exemplary embodiment of the invention microscope images showing shapes created with SμS (FIG. 6A) wide features, (FIG. 6B) narrow features, (FIG. 6C) shapes with convex curves, (FIG. 6D) differentiated neighbor shapes, (FIG. 6E) hierarchical shapes, and (FIG. 6F) macroscale variation. Material is Dow Corning Sylgard 170.

However, the blade's included angle does not fundamentally limit the included angles of surface features. If the blade is always moved along a trajectory that pushes cut material ahead of the blade then previously made cavities will not be affected and can only be as narrow as the blade profile. However, by choosing a trajectory that displaces some material backward, previous cavities are partially closed, resulting in very narrow shapes as depicted in FIG. 5 item (3a). A practical example of features molded from narrow cavities is seen in FIG. 6B.

If we let θ be the angle describing the trajectory of the blade then previously generated cavities will be affected whenever θ>λ−β, where λ is the angle of inclination of the tool and 2β is the included angle of the tool. Conversely, choosing small values of θ leads to wide cavities, resulting in shapes like those depicted in FIG. 6A. The trajectory can also be curved, resulting in features like those depicted in FIG. 5 item (4) and FIG. 6C. In addition, the trajectory can vary from one feature to the next resulting in macroscopic variations like the gentle curvature seen in FIG. 6F.

Finally, because the process is done in one fixturing, features can initially be machined to rough shape, and then sculpted again, with precise registration between operations. For example, FIG. 6E shows a set of hierarchical adhesive wedges. These were formed by initially cutting away the bulk of the volume, and then returning to sculpt the fine features at the tips.

Limitations of Surface Microsculpting

Surfaces created by SµS can be classified into three basic categories: Direct cut surfaces, which are created by cutting wax away from the final surface with the blade; direct formed surfaces, which are made by plastically deforming wax with the front face of the blade; and indirect formed surfaces, which are created by plastically deforming wax to change the shape of a previously machined surface.

Because the tool angle is currently fixed with respect to the mold surface, there is a maximum angle with respect to the mold surface at which the blade can be used in direct cutting of surfaces. Referring to the coordinate system presented in FIG. 5, this angle is:

$$\theta_{max,cut} = \lambda - \beta$$

Direct cut surfaces are seen on the right sides of cavities (1-4) in FIG. 5 denoted by the dotted lines.

Likewise, there is a minimum angle for direct formed surfaces for making undercuts. Direct formed surfaces are formed by the leading face of the blade as it is pushed through the wax; the minimum angle is:

$$\theta_{min, formed} = \lambda + \beta$$

Direct formed surfaces are seen at the left faces of cavities (1, 2, 3b, 4) in FIG. 5 and denoted with dotted lines. Note that these surfaces, as in the case of cavity (2), are not necessarily undercut.

Surfaces for which $\lambda - \beta < \theta < \lambda + \beta$ cannot be directly machined as they would intersect the blade during a machining operation. However, they can be created through indirect forming in which a previously cut cavity is altered by creating adjacent features.

The process for creating direct cut and direct formed surfaces is relatively predictable. Although the soft wax is nearly rigid/plastic, it has a small amount of elastic springback, which can slightly alter the geometry of features. In practice, the deviation in geometry is less than 20% for features 100 micrometer tall, and easily calibrated using a trial cut. For indirectly formed surfaces, it is difficult to predict precisely how much the indirect forming process will alter the geometry of cavities. Hence, it requires a certain amount of trial and error. Fortunately, the process is highly repeat-able so once the desired tool path has been found, it can be repeated across an array of features if desired.

The cutting and forming angle constraints can also be overcome by rotating the part with respect to the tool. For example, surfaces steeper than $\theta_{max, cut}$ can be made by an additional cutting operation from the opposite direction (i.e., cutting from −x to +x in FIG. 5), machining the desired surface as a direct formed surface rather than a direct cut surface. This approach requires precise registration between the forward and backward cutting setups. Undercut surfaces with shallow angles can also be made as indirectly formed surfaces with careful use of backfill. As an example, an indirectly formed surface is shown at the left side of cavity (3a) in FIG. 5. Note that its geometry is partly due to having created an adjacent cavity (3b), which affects the orientation of the left face in (3a). This interdependence between (3b) and (3a) can limit the ability to produce arbitrary cavity shapes on a feature-by-feature basis.

Comparison to Traditional SDM

One of the advantages of SDM is the ability to create complex part geometries using a relatively simple cutting tool and toolpath planning by decomposing arbitrary geometries into a series of compacts that can be deposited and machined sequentially. In each SDM cycle, features are created by precise material removal; material addition is less precise, and is usually cleaned up by subsequent machining. The material removal is a direct function of the swept path of the tool and the minimum feature size for concave features is limited by the tool size. In comparison, SµS can form shapes without removal of material. This allows for easier manufacture of undercut features, as well as allowing the manufacture of cavities narrower than the tool itself. However, it also complicates tool path planning except for geometries such as the wedge-shaped cavities used as examples in this invention.

Electrically Active Thin Film Textures

Motivation for Thin Films

Thin films of both stretchable and inextensible materials have desirable mechanical properties in many applications including adhesive tapes. The stiffness of a film in axial loading is proportional to its thickness but the stiffness in bending is proportional to the stiffness cubed. Thus as a film becomes thinner, the ratio of bending to axial stiffness decreases, so that it conforms easily to rough surfaces while evenly distributing tensile stresses. Thin films are also useful as hinge elements in complex structures. The SCM process makes extensive use of this property to create mechanical linkages from laminated materials.

Thin films are also important for flexible printed circuits and sensors. In gripping applications, electrostatic adhesion provides an ability to cling to many surfaces and can have a synergistic effect with gecko-inspired adhesion. The attractive force between an object and an electrostatic adhesive is given by $$F \propto \frac{V^2}{\delta^2}$$

where V is the applied voltage and $\delta$ is the distance of the conductive elements from the surface. While there are other terms present in an actual application of electrostatic adhesion, the effect is still dominated by an inverse square law, which indicates a large benefit in reducing the distance $\delta$. Similarly, when films are used for capacitive sensing, it is desirable to minimize the (dielectric) film thickness to increase the capacitance and sensitivity of the sensor $$C = \frac{\epsilon A}{t}$$

where C is the capacitance, A is the area, $\epsilon$ is the dielectric constant of the film material, and t is the thickness.

However, thin films are not easily created using SDM. Tolerances from fixturing, machining, and shrinkage of cast materials accumulate so that there is a danger of thin films warping or otherwise being damaged by subsequent machining steps. Additionally, the cutting forces associated with machining a cast material down to the thickness of a film are likely to delaminate or tear the remaining material. In essence, it is very difficult to machine up to the boundary of a thin film without damaging it. These difficulties motivate a process by which prefabricated and patterned films can be integrated into an SDM process.

Processing Thin Films

One of the challenges in dealing with thin films is manipulating the films themselves. The solution used here is to temporarily affix the film to a flat plate that is easy to handle and register precisely with respect to temporary reference features in the SDM part. The plate is removed after bonding cast materials to the film.

In the present case, a 25 micrometers thick metalized polyester film is first temporarily affixed to a pyrex glass plate using a mixture of dish soap and isopropyl alcohol, which is allowed to dry after manipulating the film to remove any bubbles. The film is cut to shape using a conventional IR laser and the electrode pattern is created using an UV laser to selectively ablate the metalized surface (steps F2-F4 in FIG. 4B).

A texture mold is then sculpted (M1-M5), and reference surfaces are machined using the same tool to establish the height of the plate. Small tabs of tape (with a thickness of 50 micrometers per layer) are applied between the glass and the reference flats. These, together with offsets programmed for the height of the reference flats, allow precise control of the cast film thickness. Additional processing details specific to the adhesive gripper are provided infra.

Results of Casting onto Films

It is possible to accurately and consistently cast thin layers of polymer onto a variety of substrate materials. polydimethylsiloxane (PDMS) directional adhesives have been cast onto Kapton, copper clad Kapton, and aluminum coated polyester (Mylar) films. The lamination strength to the aluminum is stronger than the aluminum-Mylar interface of the film tested. The lamination strength to Kapton and copper is lower, but still sufficient for adhesive applications as the adhesive fails before the film delaminates.

Figure 7:
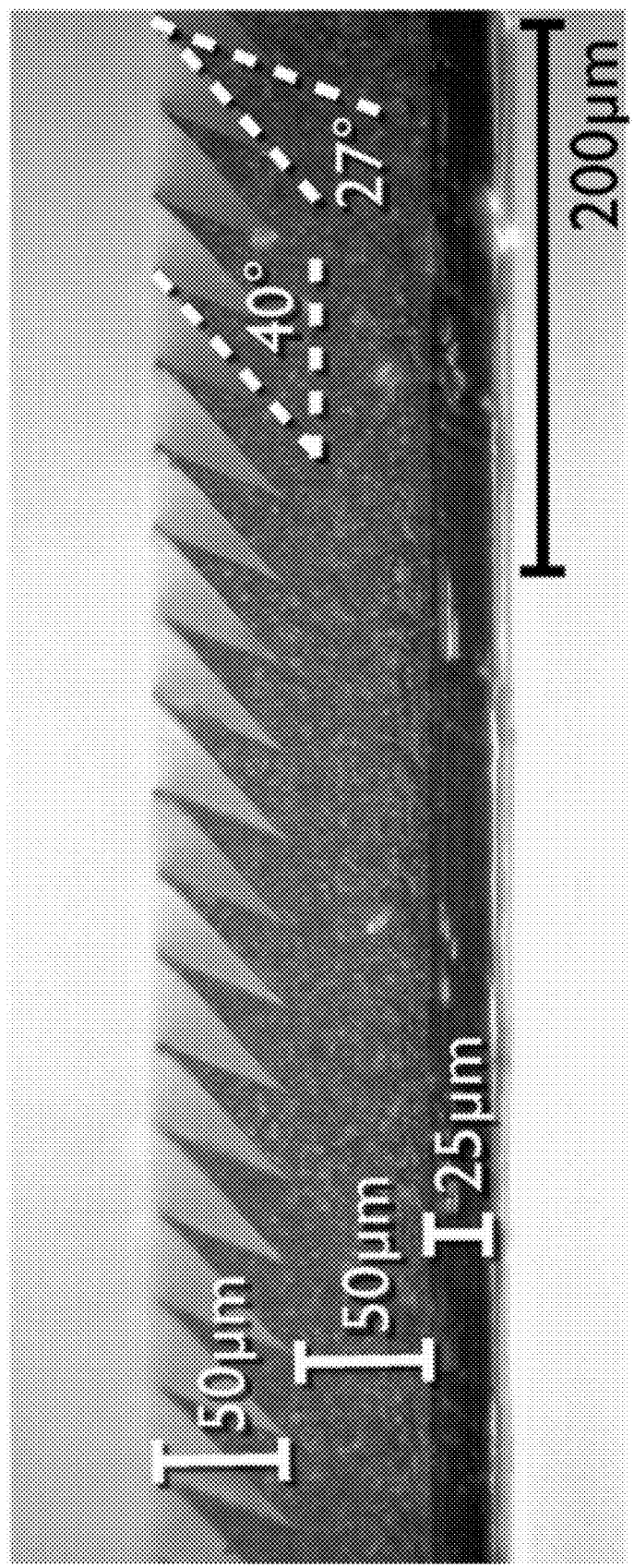
FIG. 7 shows according to an exemplary embodiment of the invention adhesive wedges cast on 25 micrometers film; total film thickness is 75 micrometers backing plus 50 micrometers texture features. Sample is from a patch of adhesives approximately 2.5 cm square; backing thickness was uniform throughout to within +/−10 micrometers. Wedges are Sylgard 170, film is Kapton.

The films have a minimum cast surface thickness of approximately 10 micrometers plus the depth of the texture features, with variability on the order of 10 micrometers. An image of adhesive wedges on a thin Kapton substrate is shown in FIG. 7.

Figure 8:
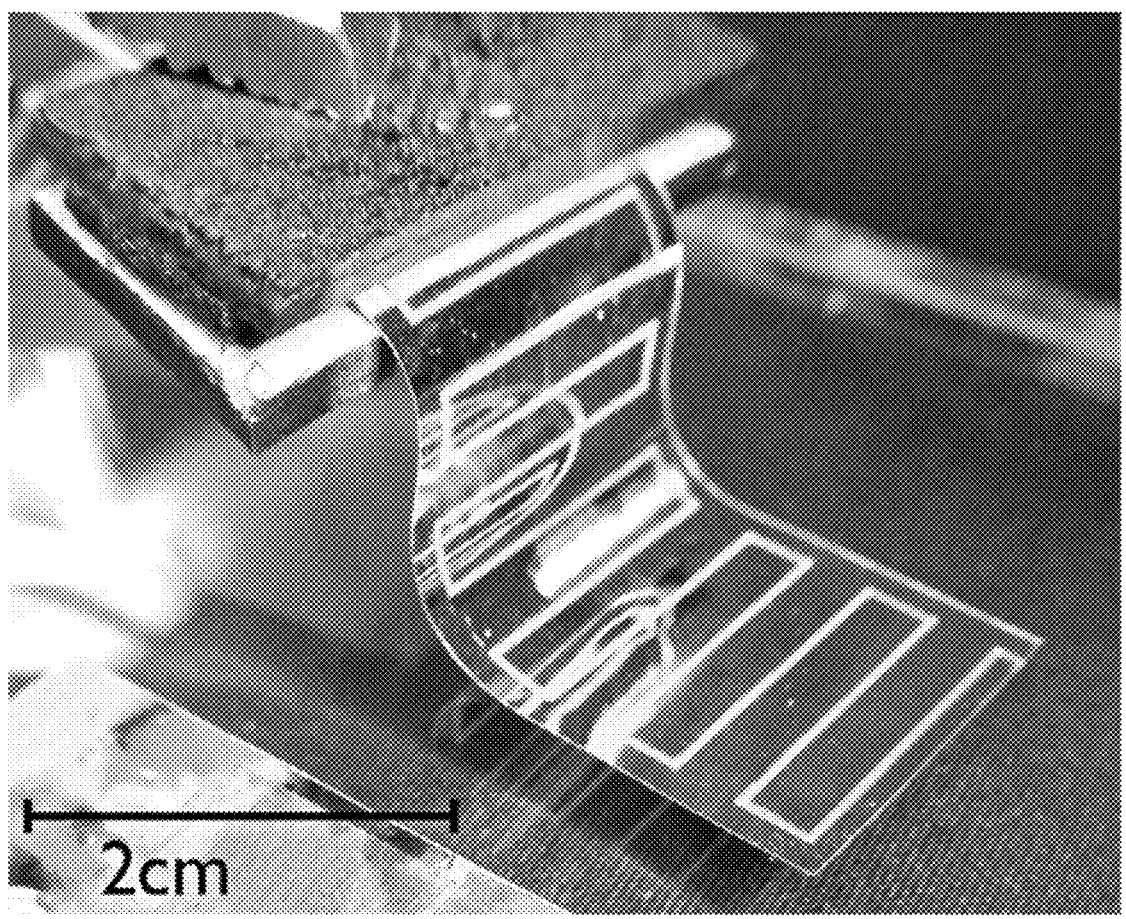
FIG. 8 shows according to an exemplary embodiment of the invention a demonstration of a patterned film electrostatically adhering to an acrylic plate. Applied voltage across the two interdigitated electrodes is 3 kV.

Both capacitive and electrostatic applications have been demonstrated. FIG. 8 shows the electrostatic adhesion obtained with 3 kV applied. While this is a large voltage, it is typical in electrostatic gripping applications. The current is very low, on the order of μA; hence, the voltage can be supplied by a small commercial high voltage power supply.

Figure 9:
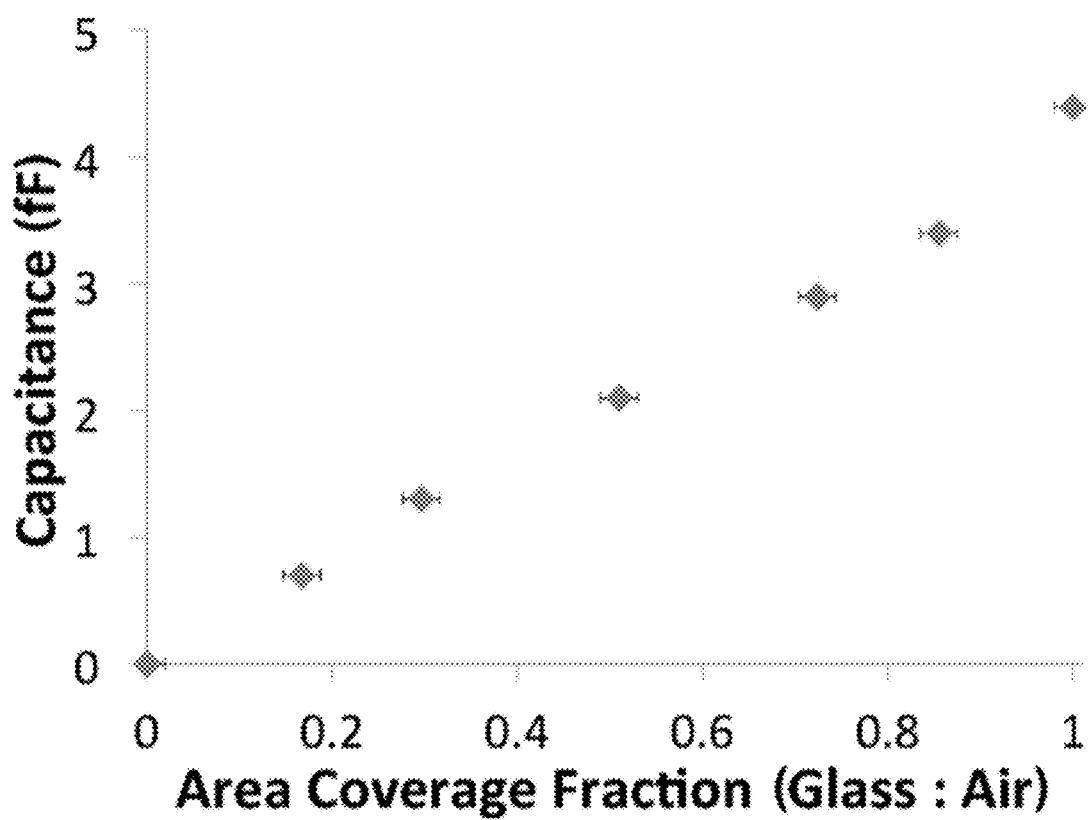
FIG. 9 shows according to an exemplary embodiment of the invention a response curve of a patterned film sensor.

FIG. 9 shows the performance of the tested capacitive sensor. An interdigitated electrode pattern was etched, and the resulting capacitance was measured as varying areas of the sensor were covered. This was not an optimized pattern, but illustrates the possibility of creating directly etched sensors.

S²DM Process Constraints

Microsculpting and thin films greatly extend the capabilities of SDM, but they also impose additional constraints on the overall process flow.

Constraints for Microsculpting in S²DM

In the process flow of FIGS. 4A-D, the microsculpting process is inserted between machining and casting steps of a traditional SDM process. Microsculpting is a process that applies a surface texture to a soft wax in preparation for casting a different material as the positive. Therefore, textures are only permitted at interfaces between the soft wax and part surfaces. They require the inclusion of soft wax areas in the SDM stack, in addition to the typical more rigid sup-port material used in SDM.

This constraint still permits texturing on both exposed and undercut part surfaces. For texturing on undercut part surfaces, the microsculpting can be performed in situ prior to casting of the main part. For exposed part surfaces, a texture mold can be sculpted, flipped, and placed over the part as the next step in the casting process. The texture mold can then be used as support material for subsequent SDM operations.

The microsculpting tool also imposes constraints on the location and orientation of textured regions. Textures that can be manufactured by the tool depend on the relative angle between the tool and the mold surface: As $\lambda$ varies, different shapes are possible. At a minimum, the process requires that $\beta<\lambda<\pi-\beta$ for sculpting. Additionally, the blade width must be less than the width of the cavity in which the texture is located. Textures can only be created on surfaces, which are accessible to the blade and oriented correctly with respect to the blade. With the current indenting tool, this constrains in situ texturing to surfaces that are no less than 76 mm wide and within a few degrees of horizontal. This, however, is a limitation of the tool and not a fundamental limit of the process. Use of a microsculpting tool, which is narrower or orientable will allow the same process to be applied to more surfaces of a part. Alternatively, a soft insert can be textured and then inserted into the mold cavity, extending the range of SIS at the expense of an additional mold.

Constraints for Thin Films in S²DM

Thin films are added as discrete components between SDM process steps. Because they are fixtured on glass in the current process, they can only be added as flat components, and only where there is enough room for the glass fixture. This constraint effectively limits thin films to be near the top of the SDM process stack. To cast films in more complex shapes, rigid fixtures could be machined to hold the films in arbitrary shapes, and then used to insert films any-where in the process.

Thin films also impose a constraint on the manufacturing of layers immediately above them. Because of tolerances in placing and aligning the film, small errors could cause a later machining toolpath to approach or even intersect the film. The result would damage the film and perhaps cause it to delaminate from the rest of the part. To avoid this potential failure, it is desirable to include a protective volume about the film when planning future toolpaths. The protective volume can be filled with either support or part material, depending on the designer's needs. Similar provisions have been used for incorporating fabrics in multimaterial SDM parts.

Manufacture of a Curved Surface Gripper

Here we describe processing details for applying S²DM to manufacture the gripper shown in FIGS. 2-3A-C. The description refers to the process steps labeled in FIGS. 4A-D.

Manufacturing Setup

The machining operations were all performed on a Haas OM-2A milling machine. The machine has a workspace of 305 254 305 mm in XYZ, with a commanded resolution throughout the workspace of 2.5 lm. The fixturing system was a System 3R pneumatic pallet chuck, which allows for precise registration between machining operations.

All microsculpting was done in the same machine, using a blade fixture rigidly mounted to the spindle nose.

The thin films were cut to shape using an Epilog 70 W IR laser, and then patterned using a 3 W UV laser from DPSS Lasers, Inc.

Thin Film Preparation

Aluminized Mylar (nominally 25 micrometers thick) was fixtured to a glass plate with the aluminum surface exposed, using the wetting technique described supra. The IR laser was then used to cut the film to the required shape; the laser was run at full speed and 5% power (F2). The excess material was peeled away, leaving the thin film part (F3).

The workpiece was then taken to the UV laser, where the electrode pattern was direct etched (F4). To align the patterning to the part, the UV laser was used to project the outline of the part; the UV beam causes the cut edges of the film to fluoresce. The outline was then visually aligned with the cut made by the IR laser. The electrode pattern was then etched with the laser at 20% power, 120 kHz pulse rate, and 2 m/s cut speed. Patterning of the film provided a minimum feature size of 70 micrometers as well as a minimum ablated feature size of 30 micrometers.

At this point, the thin film was released from the glass using water, and refixtured onto a fresh glass plate with the back exposed in preparation for addition to the SDM workflow.

Adhesive Mold Fabrication

The gripper requires two pads of adhesive oriented in opposing directions. A mold of directional adhesive wedges sufficient to cover one pad was first sculpted (M1-M3).

The pallet was then rotated 180 degrees with respect to the tool, allowing the opposing wedges to be precisely located relative to the first set (M4). The second set of wedges was then sculpted (M5).

Pieces of tape were added at the corners of the wedge mold to control film thickness. The mold was then thoroughly washed with water and isopropyl alcohol in preparation for casting wedges.

SDM Integration

Blue machinable wax (Freeman Mfg. and Supply Co.) was used as the sacrificial support material. Pockets were machined in the wax to form molds for the gripper arms, including features to protect and locate the hinge components. One half of the hinge was then placed in each arm, with plasticine clay used to prevent cast urethane from infiltrating the hinge (S1). At this time, temporary plasticine dams were added by hand to help with the casting process. The mold was thoroughly washed with isopropyl alcohol to remove any contaminants that could affect the casting process.

The arms were cast out of Smooth-On Task 3 urethane plastic (Smooth-On Inc., Easton, Pa.) (S2). Task 3 is a two-part resin, so after mixing thoroughly, the urethane was vacuum degassed to reduce bubble inclusions in the final part. The urethane was then slowly poured into the mold and briefly degassed again to reduce bubbles around the placed hinge pieces. Task 3 cures to touch in approximately 90 min; the urethane was cured for an additional 5 hours at 60 degrees Celsius to achieve final strength and hardness.

The excess urethane was machined away, and slots were milled in the gripper for the tendons to pass through the arms (S3).

A pocket was milled to help locate the thin film, and the parts and mold were again wiped down with isopropyl alcohol. A UV-cure adhesive (Loctite 352) was applied to the mating surfaces on the arms, and the film was pressed into place using the glass fixture (S4). Once the film was aligned correctly with the locating pocket, the adhesive was exposed to UV light to cure the bond. The glass fixture plate was then released from the film using water, and the film and parts were again washed with water and alcohol. The film was then treated with a primer (Dow Corning PR-1200) to improve bonding of the PDMS used for the wedges.

The elastomer used for the wedges (Dow Corning Sylgard 170) was mixed and vacuum degassed, then poured carefully along the center of the film, taking care not to entrain air bubbles (S5). The wax mold was then carefully placed onto the polymer, and pressed into contact with the blue wax surface (S6). The assembly was again subjected to vacuum to remove any bubbles introduced by placing the second mold. The excess liquid polymer was squeezed out with firm pressure. Finally, the whole setup was allowed to cure at room temperature for 24 hours with approximately 1 kPa of pressure on the film.

Final Assembly

Once the PDMS has cured, the entire assembly was demolded, and excess silicone from the casting process was trimmed away by hand. The gripper was then folded, the hinge pin inserted, and the tendons passed through the slots in the arms.

Gripper Performance

The gripper was able to generate adhesive forces on surfaces ranging from 2 cm to 56 cm in diameter, as well as surfaces with more complex curvatures. Peak force measured was 11 N on a smooth surface.

The gripper was found to be very robust, and no delamination of the film was observed, even when applying shock loads to the gripper. Dimensional creep of the film was also not found to be a problem; Mylar is low creep, and the design of the gripper can easily accommodate this.

What is claimed is:

1. A controllable adhesive for non-flat surfaces, comprising:
   (a) a conformable substrate; and
   (b) a synthetic dry adhesive film, as a separate layer from the conformable substrate, cast directly to the conformable substrate, wherein the synthetic dry adhesive film has elastomeric wedges,
   wherein the conformable substrate is capable to deform to a non-flat surface, wherein the conformable substrate has a conformability, c, with a minimum conformability, $c_{min}$, to allow the conformable substrate to conform to the non-flat surface according to $$w = \frac{3}{16} \frac{\left(\frac{r}{2}\right)^4 P}{h^3 E} (1-v)(7+3v)$$

which defines $c_{min}$ as $$c_{min} = \frac{P}{h^3 E} \propto \frac{w}{\left(\frac{r}{2}\right)^4}$$

where
   w is a depth of a valley of the non-flat surface into which the conformable substrate can conform,
   r is a spacing between peaks on the non-flat surface,
   P is an adhesive capability in the normal direction of the synthetic dry adhesive film,
   h is a thickness of the synthetic dry adhesive film,
   E is a modulus of elasticity of the synthetic dry adhesive film, and
   v is Poisson's ratio for the synthetic dry adhesive film.

2. The controllable adhesive as set forth in claim 1, wherein the conformability, c, ranges from 0.001 $cm^{-3}$ to 1000 $cm^{-3}$.

3. The controllable adhesive as set forth in claim 1, wherein the conformability, c, ranges from 0.1 $cm^{-3}$ to 1000 $cm^{-3}$.

4. The controllable adhesive as set forth in claim 1, further comprising a first loading mechanism at one end of the controllable adhesive to apply load to the controllable adhesive.

5. The controllable adhesive as set forth in claim 4, further comprising a second controllable adhesive with a second loading mechanism, wherein the first and second loading mechanism face each other and join a common point of loading.

* * * * *